Dec. 21, 1926.　　　　　W. B. E. KIRSTEN　　　　　1,611,533
INSECT SHOOTING DEVICE
Filed Feb. 7, 1924
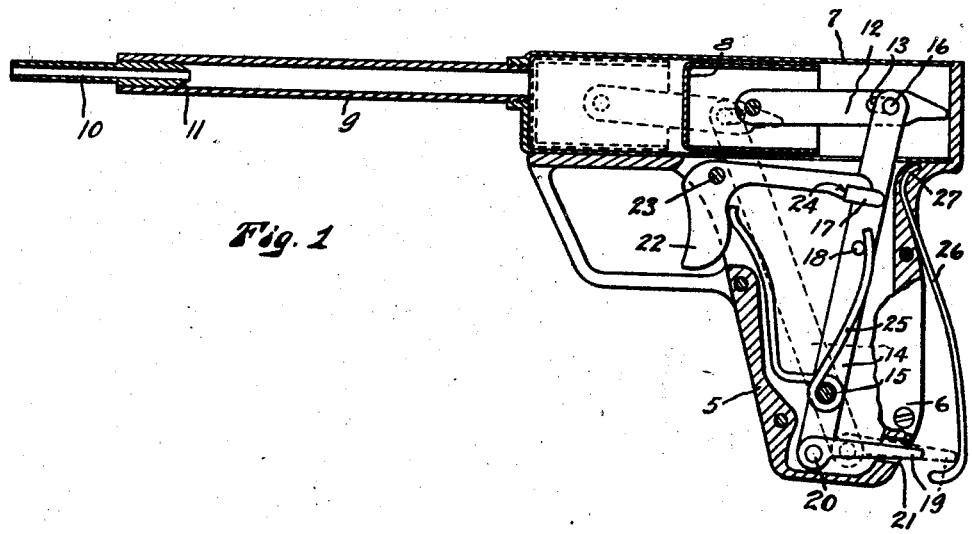
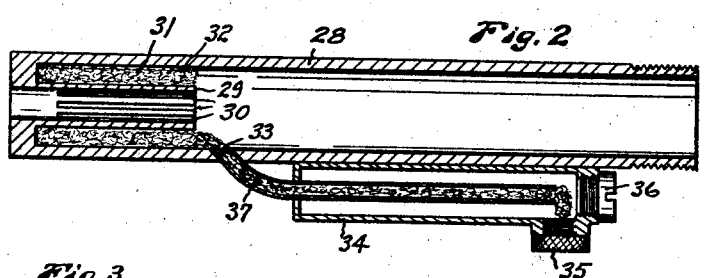
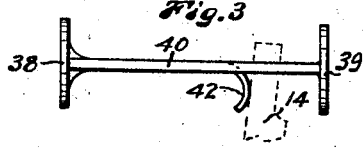
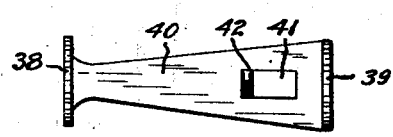
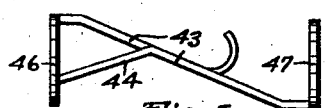
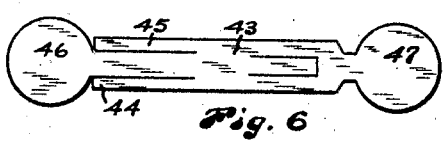
INVENTOR
Walter Bruno Erwin Kirsten
BY
G. Albright Arnold
ATTORNEY Patented Dec. 21, 1926.

1,611,533

UNITED STATES PATENT OFFICE.

WALTER BRUNO ERWIN KIRSTEN, OF SEATTLE, WASHINGTON.

INSECT-SHOOTING DEVICE.

Application filed February 7, 1924. Serial No. 691,095.

My invention relates to the art of an insect shooting device. More particularly, my invention relates to a device for discharging a shot or bead of liquid.

While I will describe my invention as respects its application to shooting insects such as flies, it is to be understood that it is not limited to any such special application, but is applicable to all uses involving like conditions and problems.

It is well known that house flies are conveyors of contaminating germs that make their existence exceedingly dangerous to health, and render said insects particularly dangerous to, and destructive of, food, in that they are often known to render the same unsanitary, and therefore unfit for human use. To the end of exterminating such insects, among other means, there have been provided liquids which, sprayed upon the said insects, shortly cause their death, said liquids in themselves being non-poisonous and non-injurious.

The device, according to present practice design, for projecting this liquid upon the said insects, consists of a sprayer, or it may be of the well-known atomizer type operated by blowing through a tube connected with said liquid. This means or method of projecting the liquid requires large quantities of the fly killing fluid, and is not adapted to be used by children to the best advantage. A primary object of my invention is to provide a means which will conserve said liquid and require only a fraction of what is ordinarily used to attain results equally efficient as respects destruction of the insects, and at the same time to provide a device which will enlist and appeal to the hunting instinct. In short, a primary object of my invention is to provide an insect shooting device in the form of a pistol.

In providing such a device, the problem of providing the same of such form and construction that it will be economical to manufacture, of long-wearing quality, of efficient operation and free from getting out of order, constitutes serious difficulties which must be overcome. A primary object of my invention is to provide such an insect shooting device.

A further difficulty in providing a shooting means which is designed to shoot a bead or shot of liquid, as distinguished from discharging a continuous stream of liquid, is met when it is desired to shoot upwardly, because the bead or shot of liquid tends to run down the barrel, and such bead or shot should be maintained in the end portion of the barrel opposite to the handle end. A further requisite in providing such a shooting means is that the bead or shot of liquid must be uniform in size, so that a condition to be satisfied in providing such an insect shooting means is to automatically provide a uniform quantity of liquid to constitute the shot or bead. The amount of fluid pressure requisite for the discharging of a bead or shot of liquid bears a ratio to the size of such bead or shot for the best operation of the device. Therefore, the uniformity or quantity of the liquid constituting such bead or shot is important. A primary object of my invention is to provide a shooting device which will satisfy the requirements and conditions set forth in this paragraph.

A further condition to be met in providing such a shooting device, wherein the bead or shot of liquid is maintained in the outward end portion of the barrel, arises in providing proper fluid pressure producing means. Merely disposing an ordinary piston in the barrel would not operate properly, for the reason that it would cause the pressure of air upon the shot of liquid to be developed gradually, and the air rushing ahead of the piston would tend to dislodge the bead or shot before the main pressure was created, i. e., before the pressure was created of such magnitude as to properly shoot out the bead. Therefore, the fluid pressure means must be such as to create very suddenly, i. e., within a relatively short period of time, a high air pressure, so that the sudden impact of this air will strike the bead or shot of liquid with such force as to carry it forward the desired distance. Any gradually increasing or slowly developed pressure would dislodge the bead or shot from the end of the barrel, so that when the main pressure came forward, there would be no shot there upon which said pressure could act. A primary object of my invention is to provide a shooting means which will overcome this difficulty and will discharge what in effect is a shot of air filled with liquid, i. e., a film of liquid with air back of it.

The above mentioned general objects of my invention, together with others inherent in the same, are attained by the device illustrated in the following drawings, the same being merely preferred exemplary forms of embodiment of my invention, throughout which drawings like reference numerals indicate like parts:

Figure 1 is a longitudinal sectional view of an insect shooting device embodying my invention;

Fig. 2 is a longitudinal sectional view of a modified form of barrel for such device;

Fig. 3 is a view in side elevation of a modified form of a piston constituting a part of said invention;

Fig. 4 is a plan view of said modified form of piston;

Fig. 5 is a side view of another modified form of piston; and

Fig. 6 is the blank for said piston.

In constructing my shooting device, I provide a handle casing 5 with a cover 6. In the upper part of the casing 5, a piston cylinder 7 is secured, in which is operatively disposed a piston 8. In one end portion of the piston cylinder 7 is secured a pistol barrel 9, and in the end portion of said barrel 9 is preferably disposed a liquid shot holding nozzle 10. The term "shot" or "bead" is used to designate a small quantity of liquid, which constitutes the projectile. This shot holding nozzle 10 is preferably provided of smaller diameter and smaller bore than the regular barrel 9, and preferably extends beyond the end of the main barrel for reasons hereinafter set forth. The inner end portion of said shot holding nozzle 10 is preferably tapered at 11, so that the edges immediately adjacent to the bore form an acute angle with said bore.

The mechanism for operating the piston 8 is as follows: A piston lever 12 is pivotally connected to said piston 8, said piston lever 12 having a slot 13 in the rear end portion thereof. Main lever 14 is pivotally mounted at 15 into said handle casing 5. The main lever 14 is pivotally connected to piston lever 12 by means of pin 16 slidably disposed in slot 13. A trigger block 17 is mounted upon said main lever 14 and a spring pin 18 is also provided on said main lever 14. On the lower end of said main lever 14, a cocking lever 19 is hingedly mounted at 20, one end of which lever 19 is slidably disposed in an opening 21 in the handle casing 5. Also, pivotally mounted on said handle casing 5 is trigger 22 at 23, said trigger 22 having a shoulder 24 disposed to engage trigger block 17. A main spring 25 may be disposed pivotally mounted on pin 15 with one end preferably bearing on trigger 22 and one end disposed against spring pin 18, so that said piston 8, through its lever connections, may be forcibly actuated in piston cylinder 7. A cocking spring 26 may be mounted as respects its end portion 27 in handle casing 5, and the other end disposed to be engaged by the cocking lever 19. The cocking spring 26 is preferably formed to constitute a part of the gripping means of the shooting device.

A modified form of barrel 28, enlarged for purposes of illustration, to operate as an automatic shot feeder, which may be provided for the shooting device embodying my invention, may be provided as follows: Said barrel may be interchangeable with the single shot barrel 9. A shot holding nozzle 29, (see Fig. 2), may be provided concentrically disposed in one end portion of barrel 28. Shot holding nozzle 29 may be provided with slots 30. In the recess 31 about shot holding nozzle 29, I preferably provide fluid absorbent means 32, which is operatively connected by a wick-like means 33 with a fluid receptacle 34, preferably in the form of a barrel subtended to barrel 28. The fluid receptacle 34 is provided with a removable cap 35, so that from time to time as occasion may demand, said receptacle may be provided with a fresh supply of fluid. Also, cap 36 is preferably provided to permit of access to the interior of receptacle 34. Wicklike member 33 is enclosed in a tube 37, which preferably extends nearly to the end of receptacle 34.

The modified form of piston shown in Figs. 3 and 4 is constructed as follows: Two disks 38 and 39 are connected with a flat member 40, having a slot 41, the material of said slot being bent downwardly to form abutment member 42, against which the end of a main spring lever 14, shown in dotted line, may strike.

The mode of operation of a device embodying my invention is as follows: Assuming that the means for operating and tripping the fluid means is in cocked position, i. e., position shown in full line in Fig. 1, the shot holding nozzle 10 is dipped into a fly exterminating fluid, and the capillary attraction of the liquid immediately causes said fluid to extend upwardly in the bore of nozzle 10. The tapered end portion 11 of the shot holding nozzle 10 prevents capillary attraction, which would otherwise lead the liquid into the bore of barrel 9. The device is then ready for shooting. It will be noted that by thus utilizing capillary attraction to fill the nozzle 10 and having the end portion tapered, the filling operation will be stopped, and there is provided a bead or shot of liquid of uniform size for each charge, so that it is possible to provide the fluid pressure producing means of proper proportion to project forward the shot of liquid. Also, it will be noted that utilizing capillary attraction in the nozzle 10 provides for using the instrument when shooting upwardly without the said shot of liquid running down the main barrel 9.

Approach to the insect is facilitated by reason of the small diameter of the shot holding nozzle 10, since no large blunt object is thereby projected towards the insect. In discharging the shooting device, trigger 22 is pulled backwardly, which lifts its shoulder 24 as respects trigger block 17, and thus spring 25 is permitted forcibly to actuate main lever 14 forwardly. The first movement of main lever 14 is without any corresponding movement on the part of piston 8 or lever 12, as during this period the pin 16 of the main lever 14 is only moving the length of the slot 13. However, when the length of said slot 13 has been travelled, the pin 16 operates with ram-like effect upon piston lever 12, and consequently upon piston 8, actuating suddenly the piston 8 forwardly at a high velocity, so that there is a sudden discharge of compressed air against the liquid in the shot holding nozzle 10. The suddenness of operation is most important for efficient operation, because a gradually increasing pressure would operate to cause some of the liquid in the shot holding nozzle 10 to escape by merely running out of the same, or with sufficient force only to make the liquid approach near to the insect, which might result in frightening the insect away, permitting it to escape the discharge, or such amount of the discharge as would be requisite to cause its death.

Cocking operation of the means for operating and tripping the fluid or air pressure producing means is accomplished as follows: When the shooting device is thus discharged, the main lever 14, piston 8 and lever 19 assume the positions indicated in dotted line shown in Fig. 1, i. e., the outer end portion of lever 19 is disposed against cocking spring 26. By gripping the handle of the handle casing 5, obviously cocking spring 26 may be forced forwardly, thereby pushing lever 9 forward and forcing the lower end portion of main lever 14 forward, which actuates the upper end of main lever 14 rearwardly, thereby drawing with it piston 8 through the connecting means of piston lever 12. Since trigger 22 is actuated downwardly by one end portion of main spring 25, it is manifest that when the trigger block 17 is carried back a sufficient distance, the shoulder 24 of trigger 22 will drop into holding position on trigger block 17. Thus, the mechanism is made ready for discharging.

The mode of operation of the automatic barrel is as follows: Capillary attraction will convey the fluid in the receptacle 34 through wick means to the fluid absorbent means 32 packed about the shot holding nozzle 29. Said fluid will then collect in small globules on the inner bore of shot holding nozzle 29 by passing down through the slots 30, so that a sufficient quantity of said liquid is automatically provided to the shot holding nozzle 29 for exterminating the ordinary insect, such as the house fly. The nozzle 29 is on an enlarged scale for purposes of illustration. In actual manufacture, it is preferably of the same size as the bore of nozzle 10. I find that when the diameter of the bore of the nozzle 10 is five-sixty-fourths of an inch (5/64"), and the bore of the barrel is fifteen-sixty-fourths of an inch (15/64"), and the diameter of the cylinder 7 is eleven-sixteenths of an inch (11/16"), an efficient shooting device is provided.

The modified form of piston, shown in Figs. 3 and 4, is designed to provide a piston for economical manufacture, as well as the modified form of piston shown in Figs. 5 and 6. The piston shown in Fig. 5 is provided with a connecting means 43, which has bracing arms 44 and 45. The blank for this piston is illustrated in Fig. 6, the same being specially designed for economical manufacture. The disk members 46 and 47 are integrally connected with the member 43.

Obviously, changes may be made in the forms, dimensions and arrangement of the parts of my invention, without departing from the principle thereof, the above setting forth only preferred forms of embodiment.

I claim:

1. An insect shooting device embodying a barrel; a liquid shot holding nozzle disposed in the end portion of said barrel relatively of smaller diameter than said barrel; an air pressure producing means consisting of a piston cylinder disposed at the end of said barrel, said cylinder being of larger diameter than said barrel; a piston operatively disposed in said cylinder; and means for operating and tripping said air pressure producing means.

2. An insect shooting device embodying a barrel; a liquid shot holding nozzle disposed in the end portion of said barrel relatively of smaller diameter than said barrel; an air pressure producing means consisting of a piston cylinder disposed at the end of said barrel, said cylinder being of larger diameter than said barrel; a piston operatively disposed in said cylinder; actuating means for said piston which is of the ram type; and means for tripping said actuating means.

3. An insect shooting device embodying a handle casing; a barrel; a piston cylinder; a piston in said cylinder; a piston connecting lever with a slot in one end thereof; a main lever pivotally connected in said piston slot to said piston lever, said main lever having a trigger block, being pivotally mounted near its opposite end portion to said handle casing; a cocking lever pivotally connected to the said main lever; a cocking spring operatively disposed with respect to said cocking lever; a trigger pivotally mounted on said handle casing and operatively disposed with respect to said trigger block; and a main spring operatively disposed with respect to said main lever and said trigger.

4. In combination with an insect shooting device, a main barrel and a small liquid shot nozzle, having the walls constituting the inner end portion forming an acute angle with respect to the bore of said liquid shot nozzle.

In witness whereof, I hereunto subscribe my name this 1st day of February, A. D. 1924.

WALTER BRUNO ERWIN KIRSTEN.